C. S. MOORE.
Car Truck.

No. 28,995.  Patented July 3, 1860.

Witnesses:
C. Cohen
J. Hirsch

Inventor:
Charles S. Moore
per atty A. B. Stoughton

UNITED STATES PATENT OFFICE.

CHARLES S. MOORE, OF ALEXANDRIA, VIRGINIA.

CONNECTING CAR-BODIES WITH TRUCKS.

Specification of Letters Patent No. 28,995, dated July 3, 1860.

*To all whom it may concern:*

Be it known that I, CHARLES S. MOORE, of the city and county of Alexandria and State of Virginia, have invented certain new and useful Improvements in the Manner of Connecting Car-Bodies, Locomotives, or Tenders with their Trucks or Running-Gear; and I do hereby declare the following to be a full, clear, and exact description of the construction and operation of the same, reference being had to the accompanying drawings, making a part of this specification, in which—

Figure 1:
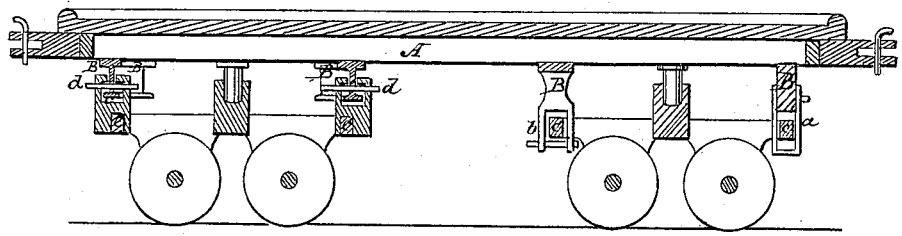
Figure 2:
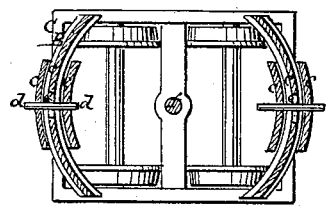
Figure 3:
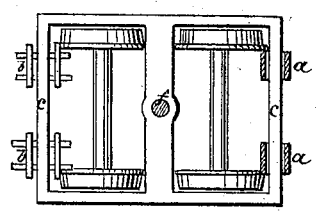
Figure 4:
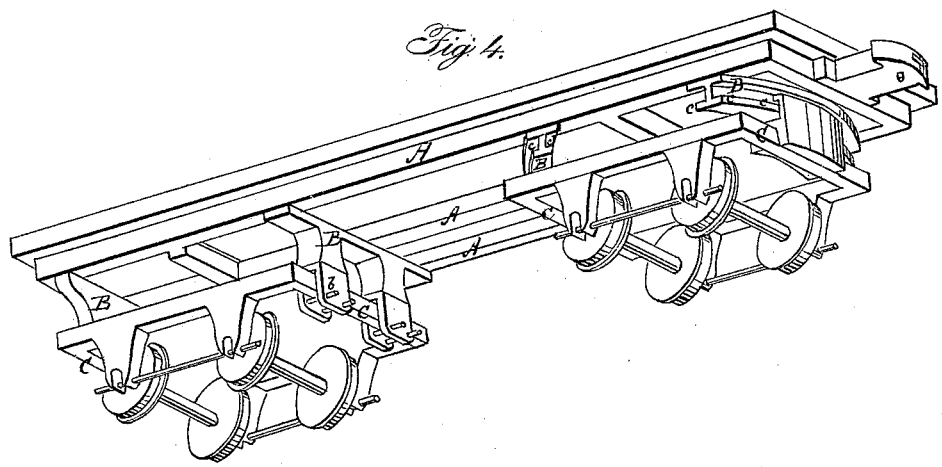

Figure 1, represents a longitudinal vertical section through a car constructed after my plan. Figs. 2 and 3, represent top plans of the trucks, with their attachments in horizontal section to show their construction and mode of connection. Fig. 4 represents a perspective view taken from the underside of the car, to show the general arrangement of the trucks and car body, and their connections.

Similar letters of reference where they occur in the drawings denote like parts of the car in all the figures.

In the construction of cars, locomotives, or tenders, a central support, of the body, upon the trucks, is preferred, but when a wheel or axle breaks, and impedes the motion of the car—the truck invariably turns square, or nearly so, across the track, and must in this position throw the car, or other body that it is carrying, off the track. To prevent the trucks from thus turning around in case of accident, chains have been used, but from the flexibility or other causes they do not act reliably.

My invention consists in so connecting the body with the trucks, as to preserve the central support—give the trucks all the free play that they require vertically and horizontally, and when a wheel or axle breaks, hold the truck parallel or nearly so to the car body, and thus prevent it from lifting up, and overturning, or throwing the car or other body off the track.

To enable others skilled in the art to make and use my invention I will proceed to describe the same with reference to the drawings.

The car body, truck and truck frame may be of any of the well known forms of construction—my invention being applicable to cars already built, as well as to those to be built.

To the bottom of the car, body frame A, I attach guiding pieces B, so as to be immediately over the front and rear cross-pieces C, of the truck frame, and these two pieces are united so that, while the truck has all the usual and necessary play, it cannot in case of accident get across the track, but must remain parallel or nearly so with the body. This union between the truck and car frame, may be variously made as for instance by stirrups as at *a*—by hangers as at *b*, or by the flanged segments as at *c*. In the first and second modification, the truck frame can only move a certain distance laterally, and then it is restrained from further movement in that direction by the stirrups or hangers. In the third modification, the lateral motion is defined by a pin *d*, and slot *e*, which limits the motion, or play of the truck. The central supports *f*, keep these connections from binding, and the play between the connections should be uniform both above and below, so as not to cramp the truck frame.

Should a wheel or axle break, they could not by even coming against the remaining wheel, axle, or truck, turn it around from its proper position in relation to the car body, because the extent of motion of the truck out of a right line, is limited and defined, and though it may turn to this limit, yet it will still keep on the track, and thus save the car, locomotive or tender from being thrown off. Nor will the car-body by such accidental breakage be much if any let down or swayed; it will continue on the track, and hold the truck parallel or practically so to itself, and thus avoid the danger of being thrown off. This construction has proven in practice that, a car may be run several miles, with a broken axle, without leaving the track.

Having thus fully described the nature and object of my invention, what I claim therein as new is,

Securing the trucks of a car, locomotive, or tender to the body or frame by means of the connections herein described so that, while the trucks have the usual play on the body, or between the rails, they will, in case of the breaking of the wheels or axles, or both, be held parallel, or nearly so, to the body or frame, and thus prevent the car, locomotive, or tender from being thrown off the track, substantially as herein described.

CHAS. S. MOORE.

Witnesses:
A. B. STOUGHTON,
E. COHEN.